US008656020B1

(12) United States Patent
Rademacher et al.

(10) Patent No.: US 8,656,020 B1
(45) Date of Patent: Feb. 18, 2014

(54) DELTA COMPRESSION OF FILES IN WEB APPLICATIONS

(75) Inventors: Pablo Rademacher, Mountain View, CA (US); Joshua Harrison, Menlo Park, CA (US); Christopher Harrelson, Berkeley, CA (US); Evan Parker, Atherton, CA (US)

(73) Assignee: Google Inc., Mountain View, CA (US)

( * ) Notice: Subject to any disclaimer, the term of this patent is extended or adjusted under 35 U.S.C. 154(b) by 928 days.

(21) Appl. No.: 12/691,369

(22) Filed: Jan. 21, 2010

(51) Int. Cl.
*G06F 15/173* (2006.01)

(52) U.S. Cl.
USPC .......................................... 709/226; 709/203

(58) Field of Classification Search
None
See application file for complete search history.

(56) References Cited

U.S. PATENT DOCUMENTS

| 6,021,413 | A | 2/2000 | Vaduvur et al. | |
|---|---|---|---|---|
| 8,335,819 | B2 * | 12/2012 | Fu .................................. | 709/203 |
| 2003/0204573 | A1 * | 10/2003 | Beck et al. .................... | 709/218 |
| 2006/0026260 | A1 * | 2/2006 | Mullen et al. ................ | 709/217 |

OTHER PUBLICATIONS http://en.wikipedia.org/wiki/Data_URI_scheme, downloaded from the Internet on Nov. 16, 2009, 5 pages.
Mogul, et. al., "Delta encoding in HTTP", RFC 3229, Jan. 2002, 46 pages.
Korn, et. al., "RFC 3284—The VCDIFF Generic Differencing and Compression Data", Jun. 2002, 22 pages.
Korn, et. al., "The VCDIFF Generic Differencing and Compression Data Format", Jun. 2002, 23 pages.

* cited by examiner

*Primary Examiner* — Mohamed Ibrahim
(74) *Attorney, Agent, or Firm* — Lerner, David, Littenberg, Krumholz & Mentlik, LLP (57) ABSTRACT

A system and method provides secondary resource files in response to a request for a web page from a client device. In response to the request, a server provides an HTML file which identifies a secondary resource file, such as a javascript file, and the current version value of the secondary resource. The HTML file may be associated with a header which prevents the file from being cached. If there is no locally-cached version of the secondary resource file, the file is requested from the server. The server will transmit the secondary resource file with a header indicating that the file is to be stored indefinitely. If there is a locally-cached version of the secondary resource file, the client device compares the version value of the locally-cached version to the received current version value. If the values are different, the client requests the differences between the files. The server provides a difference file which the client device uses in conjunction with the locally-cached version of the secondary resource to generate the current version of the secondary resource.

19 Claims, 3 Drawing Sheets

DELTA COMPRESSION OF FILES IN WEB APPLICATIONS

BACKGROUND OF THE INVENTION

Generally, when a web browser requests information, for example a web site or file, the request is filtered through the browser's cache system. The cache system will determine whether the file is stored locally. If the file is not stored locally, the request may be forwarded, for example, to a web server.

Web applications, such as web sites, may regularly update HTML, javascript, CSS, and other auxiliary files. Some systems, such as Google Maps update javascript files on a regular basis. These files may be hundreds of kilobytes in size, and on average may take several seconds to transmit to the browser. Each time these files are updated, the web browser must request them in full from the web server.

Transmitting these auxiliary files may add significant latency to a web application's startup time, and may increase the amount of traffic sent across the network.

BRIEF SUMMARY OF THE INVENTION

One aspect of the invention provides a method of providing a secondary resource to a client device on a computer network. The method includes receiving, from a client device, a first request for information; transmitting, in response to the first request for information, a first version value, a location of a secondary resource associated with the first version value, and an indication that the first requested information is not to be stored; transmitting, by a server, the secondary resource associated with the first version value, the first version value, and an indication that the secondary resource associated with the first version value and the first version value are to be stored; receiving, by the server, a second request for information from the client device; transmitting in response to the second request for information a second version value, a location of a secondary resource associated with the second version value, and an indication that the second requested information is not to be stored; receiving a request, if the first version value is different from the second version value, for difference information based on the differences between the secondary resource associated with the first version value and the secondary resource associated with the second version value; identifying the difference information; and transmitting the difference information to the client device for generating the secondary resource associated with the second version value from the difference information and the secondary resource associated with the first version value.

In one example, the indication that the secondary resource associated with the first version value is to be stored is a file header. The file header may include an indication that the secondary resource associated with the first version value does not expire.

In another example, requesting the difference information is performed locally at the client device.

In a further example, the method also includes generating, in response to receiving the request for the difference information, the difference information based on the differences between the secondary resource associated with the first version value and the secondary resource associated with the second version value.

In yet another example, the method includes retrieving, in response to receiving the request for the difference information, the difference information from memory accessible by the server.

In still another example, the location of the secondary resource associated with a second version value is the location of the secondary resource associated with the first version value.

In an additional example, the location of the secondary resource associated with a second version value is different from the location of the secondary resource associated with the first version value.

In another example, the secondary resource file, the first version value, and the indication that the secondary resource associated with the first version value and the first version value are to be stored are transmitted within a secondary resource carrier. In one alternative, the secondary resource carrier further includes instructions for comparison of the first version value with a different version value. In another alternative, the secondary resource carrier further includes instructions for requesting the difference information the first version value is different from the second version value.

Another aspect of the invention provides a device for providing secondary resource files to a client device over a network. The device includes a processor; and memory, including a first part for storing secondary resource files. The processor being configured to receive a first request for information from the client device; transmit, in response to the first request for information, a first version value, a location of the secondary resource associated with the first version value, and an indication that the first requested information is not to be stored; transmit the secondary resource associated with the first version value, the first version value, and an indication that the secondary resource associated with the first version value and the first version value are to be stored; receive a second request for information from the client device; transmit, in response to the second request for information, a second version value, a location of a secondary resource associated with the second version value, an indication that the second requested information is not to be stored, and instructions to request difference information if the first version value is different from the second version value; receive a request for difference information; identify the difference information; and transmit the difference information to the client device.

In one example, the memory includes a second part for storing difference information.

In another example, the difference information is determined by identifying the differences between the secondary resource associated with the first version value and the secondary resource associated with the second version value.

In a further example, the location of the secondary resource associated with a second version value is the location of the secondary resource associated with the first version value. The indication that the second requested information is not to be stored may be a file header.

A further aspect of the invention provides a device for displaying web page information incorporating one or more secondary resources. The device includes a processor; a user input apparatus for providing data to the processor; memory; and an electronic display. The processor is configured to transmit, to a server over a network, a first request for information; receive a first version value, a location of secondary resource associated with the first version value, and an indication that the first requested information is not to be stored; receive the secondary resource associated with the first version value, the first version value, and an indication that the secondary resource associated with the first version value and the first version value are to be stored; store the secondary resource associated with the first version value and the first version value in memory accessible by the client device;

receive a second version value, a location of a secondary resource associated with the second version value, and an indication that the second requested information is not to be stored; request, if the first version value is different from the second version value, difference information based on the differences between the secondary resource associated with the first version value and the secondary resource associated with the second version value; receive the difference information; and generate the secondary resource associated with the second version value from the difference information and the secondary resource associated with the first version value.

In one example, the processor is also configured to use the generated secondary resource to display a web page on the electronic display.

In another example, the secondary resource file, the first version value, and the indication that the secondary resource associated with the first version value and the first version value are to be stored are received within a secondary resource carrier.

In a further example, the secondary resource carrier further includes instructions for comparison of the first version value with a different version value.

DETAILED DESCRIPTION

Figure 1:
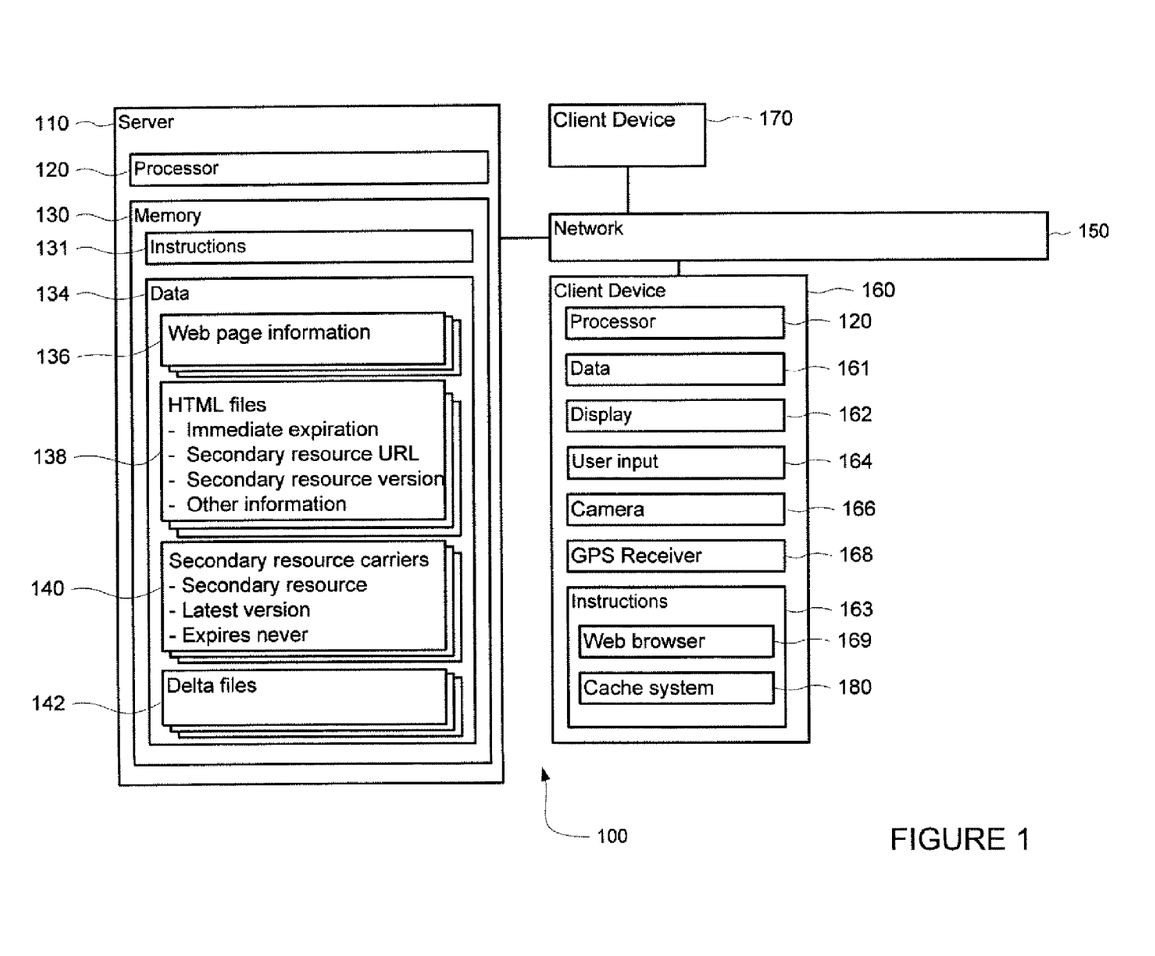
FIG. 1 is a functional diagram of a system in accordance with an aspect of the invention.
Figure 2:
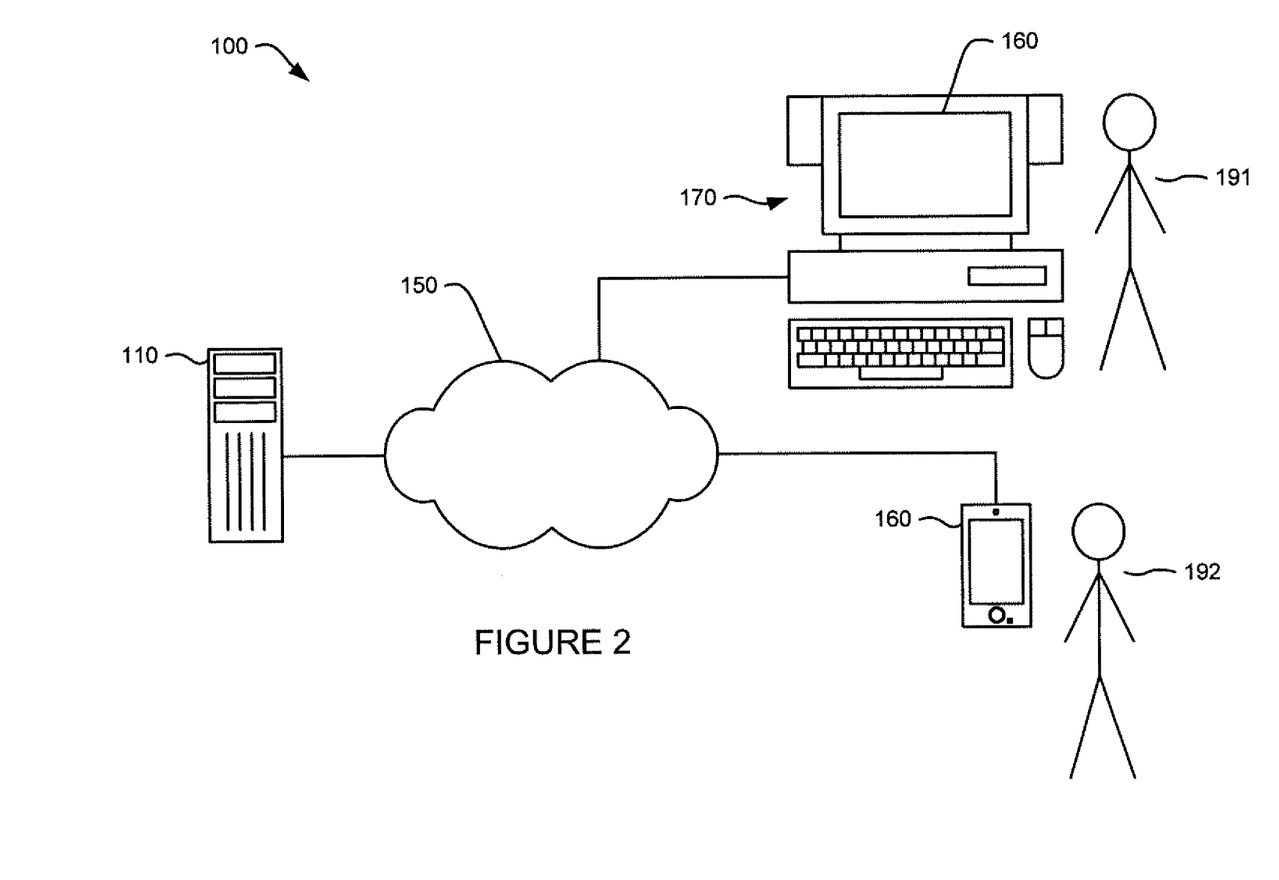
FIG. 2 is a pictorial diagram of a system in accordance with an aspect of the invention.

As shown in FIGS. 1-2, a system 100 in accordance with one aspect of the invention includes a computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor or computer will be understood to include references to a collection of processors or computers or memories that may or may not operate in parallel.

The computer 110 may be at one node of a network 150 and capable of directly and indirectly communicating with other nodes of the network. For example, computer 110 may comprise a web server that is capable of communicating with client devices 160 and 170 via network 150 such that server 110 uses network 150 to transmit and display information to a user 190 on display 162 of client device 170. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

Network 150, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device may be configured similarly to the server 110, with a processor, memory and instructions. Each client device 160 or 170 may be a personal computer intended for use by a person 191-192, and have all of the components normally used in connection with a personal computer such as a central processing unit (CPU) 120, memory (e.g., RAM and internal hard drives) storing data 161 and instructions 163, an electronic display 162 (e.g., a monitor having a screen, a small LCD touch-screen, a projector, a television, a computer printer or any other electrical device that is operable to display information), user input 164 (e.g., a mouse, keyboard, touch-screen or microphone), camera 166, GPS receiver 168, speakers, a network interface device, and all of the components used for connecting these elements to one another.

Although the client devices 160 and 170 may each comprise a full-sized personal computer, they may alternatively comprise mobile devices capable of wirelessly exchanging data with a server over a network such as the Internet. By way of example only, client device 160 may be a wireless-enabled PDA or a cellular phone capable of obtaining information via the Internet. The user may input information using a small keyboard (in the case of a Blackberry phone), a keypad (in the case of a typical cell phone) or a touch screen (in the case of a PDA). Indeed, computers in accordance with the systems and methods described herein may comprise any device capable of processing instructions and transmitting data to and from humans and other computers including general purpose computers, network computers lacking local storage capability, and set-top boxes for televisions.

Although certain advantages are obtained when information is transmitted or received as noted above, aspects of the invention are not limited to any particular manner of transmission of information. For example, in some aspects, information may be sent via a medium such as an optical disk or portable drive. In other aspects, the information may be transmitted in a non-electronic format and manually entered into the system. Yet further, although some functions are indicated as taking place on a server and others on a client, various aspects of the system and method may be implemented by a single computer having a single processor.

Data 134 may include web page information 136. Web page information may include information such as URLs, content, and the identity of associated HTML files 138. For example, as will be described in more detail below, server may receive a request for a web page from a client device and use web page information to determine which HTML files to transmit to the client device.

HTML files may be used to generate and display web pages at a client device. HTML files may include web site content and other such information. HTML files may also identify the URL of one or more secondary resource files as well as the current version of the secondary resource file.

HTML files may be transmitted using the HTTP protocol. An individual HTTP response may contain one or more headers and a payload. The HTTP payload may be the contents of the transmitted file, for example an HTML file, a plain text file, or an image file. An HTTP header may also specify various information, such as meta data, about the including file type and/or caching instructions.

Caching instructions may be used by a server, client, or other network device to determine whether and how long to store a file in cache memory. For example, cache memory may store or retain data for a finite period of time, indefinitely, or not retain the data at all. As will be described in more detail below, HTML files may be associated with headers which expire immediately or which expired previously in order to indicate that a file is not to be cached.

Secondary resource carriers 140 may include one or more payload files used to build a web page for display at a client device. A secondary resource carrier may be programmed according to a protocol, for example a Web Application Delta Compression protocol or WADC protocol. Each secondary resource of the WADC protocol may include WADC meta data such as a version number and a WADC payload file. The payload file may be a secondary resource file. While the following examples describe the use of javascript files as secondary resource files, it will be appreciated that secondary resources may include text files, XML files, HTML files, CSS files, images such as base-64 data-URI images, or files utilizing various programming languages. The secondary resource carrier may also include additional instructions, such as caching instructions, informing a client or other network device what to do with the secondary resource. For example, a client device may request a file such as foo.js containing data "ABC." In the example, the secondary resource is the foo.js file and "ABC" is the payload. The server may return a secondary resource carrier which may be displayed as: carrier.js={executable code for versioning/patching, payload="ABC", filetype"Text/javascript", filename="foo.js"}.

Data 134 may also include delta files 142. For example, server 110 may identify the differences between an older and a newer version of a secondary resource file. These differences may be built into a delta file which may be merged with the older version to generate the newer file. Delta files may be stored in data 134 or generated as needed by the server.

Client device 170 may include a client cache system 180. For example, the client cache system may be used by the client's web browser 169 to manage files requested and received from the server. As will be described in more detail below, the client cache system may access cache memory for storage of various files. It will be appreciated that although the cache memory is described at being accessible by a client device, it will be understood that there may be any number of intermediary caches on the network between the sever and the client, as well as at cache memory accessible by the server. These additional cache systems may work independently of the invention and may or may not follow the caching instructions.

Figure 3:
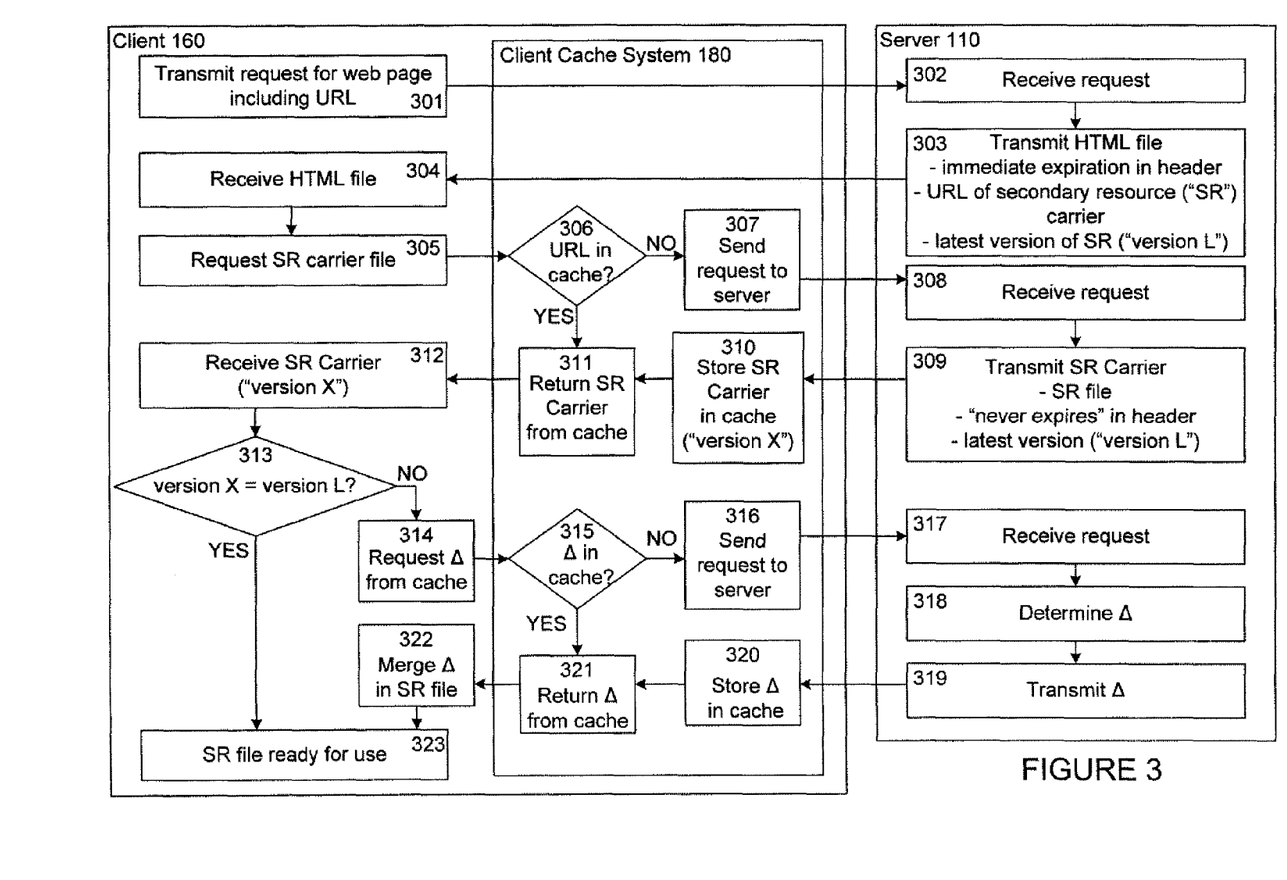
FIG. 3 is a flow chart in accordance with an aspect of the invention.

FIG. 3 depicts an embodiment which will be described in detail below. It will be understood that the following websites, filenames, and URLs are exemplary only and the system and method may accommodate various deviations from the example. In addition, operations do not have to be performed in the precise order described below. Rather, various steps can be handled in reverse order or simultaneously.

As shown in block 301 of FIG. 3, a client device, such as client 160, may request a web page, such as "http://www.a.com/maps/index.html." For example, the request may identify a URL and may be transmitted to a server such as server 110. In another example, the client cache system 180 may receive the request, identify that the URL is not stored in cache, and forward the request to the server.

Server 110 may receive the request for the web page and transmit an associated HTML file as shown in blocks 302 and 303. The HTML file may be associated with a header which indicates that the file expires immediately or expired in the past. Upon receipt of the HTML file at block 304, the client cache system may determine whether the HTML file is to be cached based on the header. The HTML file also includes the identification, for example a URL, of a secondary resource file. In addition, the HTML file may identify the current version, as shown in block 303, "version L," of the secondary resource file.

For example, the server may receive a request for a web page, "http://www.a.com/maps/index.html." The server may respond by transmitting an HTML file "index.html." The HTML file may be associated with an "expires" header indicating that the file should expire immediately or in the past. In another example, the server may also send a "cache-control: no-cache" header to ensure that the HTML file is not cached. If there are subsequent requests for the same web page, the HTML file will not be stored in the client cache system, and accordingly, the web page will be requested in full from the server.

The "index.html" file may include a reference to a javascript file or other secondary resource file as well as a numeric or other encoding of the most recent version number. For example, the "index.html" file may resemble the following:
<head>
   <script type='text/javascript'>
   var latest_version=56;
   </script>
   <script
src='http://www.a.com/maps/main.js'></script>
   </head>
. . .
In the example, the latest version of the javascript file is "56." The URL of the javascript file is "http://www.a.com/maps/main.js". The version number of the javascript file may not be included as part of the URL or filename. It will be understood that versions may be expressed in any number of ways, for example, decimal or whole-number values, letters, or any combination of the foregoing. Further, versions need not be changed by increasing numerical values, rather any relevant change to the version value may be used.

The secondary resource file may be identified in various additional ways. For example, the client may compute the filename dynamically during run-time, the file may be fetched using XMLHttpRequest, or the file may be fetched by dynamically creating a new SCRIPT tag.

The client device may parse the HTML file and upon identifying the secondary resource file, may request the secondary resource file from the client cache system as shown in block 305. At block 306, the client cache system may determine whether the secondary resource file is cached. Where the secondary resource file is in cache, the client cache system may return the cached file to the client device as shown in block 311. Where the secondary resource file is not in cache, the client cache system may request the secondary resource file from server 110 as shown in block 307.

For example, the web browser of the client device may identify "http://www.a.com/maps/main.js" in the "index.html" file. The web browser may request this file from the client cache system. The first time the request is made, the client cache system may determine that the javascript file is not in cache and request the file from server 110. If the client cache system identifies a locally-cached version of the secondary resource file, the client cache system will return the locally-cached version.

It is possible for a locally-cached version of the secondary resource file to be purged from the client cache system. For example, the user may select to purge the cache in a web browser or the web browser may automatically purge the cache such as where the cache has reached a pre-set capacity. If the locally-cached version of the secondary resource has been purged from the cache since the previous request, the client cache system may automatically request the secondary resource file in full from the server, as if the file was never previously cached.

Where the client cache system has not identified a locally-cached version of the secondary resource file, the client cache system will request the file from server 110 as shown in block 307. The server may receive the request for the secondary resource file and transmit a secondary resource carrier as shown in blocks 308 and 309. The secondary resource carrier may include a secondary resource file payload and other information as described above. The secondary resource carrier may be associated with a header which indicates that the secondary resource carrier is never to expire. The secondary resource carrier may also include the version number of the payload file.

For example, the client cache system may request "http://www.a.com/maps/main.js" from server 110. The server may transmit the a carrier containing the javascript file payload to the client device with an "expires-never" header indicating that the file should never expire and that the client cache system should always attempt to use a locally-cached version of the javascript file. Accordingly, the client cache system may store the received javascript file.

Upon receipt of the secondary resource carrier, the client cache system may determine that the secondary resource carrier is to be cached indefinitely based on the header. As shown in block 310, the secondary resource carrier is cached as "version X" in the system. The client cache system may return the secondary resource carrier from cache as shown in block 311.

Upon receipt of the cached secondary resource carrier as shown in block 312, the client device may execute the payload file. The secondary resource carrier may include instructions which require the client to compare the locally-cached version of the secondary resource (for example version X) to the version identified in the received HTML file (for example version L). As shown in block 313, if version X=version L, the secondary resource file is ready for use. If the version X≠L, as shown in block 314, the client will request the difference or delta file based on the differences between version X and version L from the client cache system.

For example, the received "index.html" may identify the javascript file "http://www.a.com/maps/main.js" and a latest version such as "latest_version=57". The client cache system may return the secondary resource carrier containing the payload "http://www.a.com/maps/main.js" from cache. The cached version may be version 56. In one example, a cached javascript carrier may resemble the following:
   1 var cached_version=56;
   2 var filetype="text/javascript";
   3 var filename="main.js";
   4 var javascript_code=" . . . sequence of javascript instructions for version 56 . . . "
   5 var javascript_code_latest;
   6 if (cached_version==latest_version) {
   7 javascript_code_latest=javascript code;
   8 } else {
   9 var diffs=
   10 fetch_differences_from_server (cached_version, latest_version); 11 javascript_code_latest=apply_differences (javascript code, diffs);
   12 }
   13 eval (javascript_code_latest);
The client may compare "latest_version=57" to "cached_version=56" and determine that these values are different, for example by evaluating line 4 above and determining it to be FALSE. Accordingly, the client will request the differences from the client cache system.

As shown in block 315, the client cache system may determine whether the delta is cached. If the delta is cached, the client cache system will return the locally-cached delta as shown in block 321. If the delta is not stored in the cache, the client cache system will request the delta from the server as shown in block 316.

At block 317, server 110 may receive the request for the delta. The request may include the version number of the locally-cached secondary resource payload. As shown in block 318, server 110 may use the received version number to determine an associated delta file. Server 110 may use any known encoding of file differences, for example, the server may use the Unix "diff" command to generate a list of file segments which differ between the two segments. These delta files may be determined in advance or upon a request from the client device. When server 110 has determined the appropriate delta, the server may transmit the delta to the client as shown in block 319.

At block 320, the client device may receive and cache the delta file. As described above, the delta file may also be associated with a header indicating that the delta file is to be cached indefinitely. Thereafter at block 321, the client cache system returns the delta file for use by the client.

As shown in block 322, the client may merge the delta file into the locally-cached secondary resource payload. The merger constructs the latest version of the file from the locally-cached secondary resource payload and the delta file. The merged file may be ready for use as shown in block 323.

For example, the client may merge the received delta file with the locally-cached version, version 56, of "http://www.a.com/maps/main.js." The merger may produce version 57 of the payload file. This file may be ready for use.

As the distance between version numbers increases, the size of delta files may also increase. Eventually, the server may transmit the entire new secondary resource file. In order to prevent this, the system and method may also utilize epochs.

Epochs may be fixed values which serve as reference points for all future difference calculations. Epochs may function as changes to the URL of the secondary resource file. For example, the epoch may be encoded as part of the filename, the file path, or elsewhere in the URL for the file. As the epoch changes, the name of the secondary resource file received in the HTML file is changed. Thus, epochs may force the client to request a new secondary resource from the server rather than retrieving a locally-cached version and requesting a delta.

For example, if the client requests the web page "http://www.a.com/maps/index.html." The server may respond by transmitting an HTML file "index.html" with an "expires" header indicating that the file should expire immediately or in the past. If the version of the javascript file is 1, the "index.html" file may resemble the following:

```
<head>
    <script type='text/javascript'>
    var latest_version=1;
    </script>
    <script src='http://www.a.com/maps/main.1.js'></script>
</head>
...
```

In the example, the epoch is encoded in the filename or URL of the javascript file as 'main.1.js.' The method may continue as described above.

If the difference file for two versions is still relatively small, the epoch may not be updated. For example, the client requests the web page "http://www.a.com/maps/index.html" sometime after the version has been updated, for example from version 1 to version 3, the "index.html" file may resemble the following:

```
<head>
    <script type='text/javascript'>
    var latest_version=3;
    </script>
    <script src='http://www.a.com/maps/main.1.js'></script>
</head>
...
```

In the example, although the version number has been updated, the epoch encoded in the URL of the javascript file remains the same: "main.1.js." The version may not correspond in value or in form to the epoch.

When the differences between versions have become relatively large, the epoch may be updated. For example, the determination of when the differences between version are too large may be made by comparison to a fixed size of the difference file. In another example, the determination may be made by comparison to a compression ratio, such as when the difference file exceeds 30% of the full size of the latest version.

The epoch may also be updated on a regular schedule regardless of the size of the difference files, or for any other reason or on any other schedule. For example, if the secondary resource file is updated daily, then epoch may be updated weekly. In another example, if the application updates weekly, the epoch may be updated monthly. However, if the epoch is updated too often, for example, with each new version of the secondary resource file, the client cache system would have to request the secondary resource file each time from the server.

The epoch may be updated by changing the filename or URL of the secondary resource file. For example, if the current version of the javascript file is 16 and the differences between version 16 and version 1 are relatively large, the epoch may be updated. Thus, the "index.html" file may resemble the following:

```
<head>
    <script type='text/javascript'>
    var latest_version=16;
    </script>
    <script src='http://www.a.com/maps/main.16.js'></script>
</head>
...
```

In the example, the epoch has been updated to reflect the current version of the javascript file: "main.16.js." The javascript file "http://www.a.com/maps/main.16.js" may not be locally-cached as it has not been received from the server. Accordingly, the client cache system will request the file in full from the server and the file "http://www.a.com/maps/main.1.js" may no longer be needed.

As described above, the "http://www.a.com/maps/main.16.js" may be associated with an "expires-never" header and the system may continue to request deltas as the version changes until there is a new epoch.

While the foregoing examples demonstrate various embodiments focused on the utilization of a single secondary resource file, it will be appreciated that the system and method may be used in conjunction with any number of secondary resource files. For example, the HTML file may identify a plurality of secondary resource files. In another example, the secondary resource file, "main.js," may be spread among multiple javascript files rather than a single file. The system and method may be used with some or all of these additional secondary resource files individually or at once.

Server 110 of FIG. 3 is shown in a single block. However, it will be understood that the functions of FIG. 3 and those described above as performed by server 110 may be performed by a single server or a plurality of servers working individually or cooperatively.

It will be further understood that the sample values, types and configurations of data described and shown in the figures are for the purposes of illustration only. In that regard, systems and methods in accordance with aspects of the invention may include different web sites, data values, data types and configurations, and may be provided and received at different times (e.g., via different web pages) and by different entities (e.g., some values may be pre-suggested or provided from different sources).

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method of providing a secondary resource to a client device on a computer network, the method comprising:
   receiving, from a client device, a first request for information;
   transmitting, in response to the first request for information, a first version value, a location of a secondary resource associated with the first version value, and an indication that the first requested information is not to be stored;
   transmitting, by a server, the secondary resource associated with the first version value, the first version value, and an indication that the secondary resource associated with the first version value and the first version value are to be stored;
   receiving, by the server, a second request for information from the client device;
   transmitting in response to the second request for information a second version value, a location of a secondary resource associated with the second version value, and an indication that the second requested information is not to be stored;
   receiving a request, if the first version value is different from the second version value, for difference information based on the differences between the secondary resource associated with the first version value and the secondary resource associated with the second version value;
   identifying the difference information; and
   transmitting the difference information to the client device for generating the secondary resource associated with the second version value from the difference information and the secondary resource associated with the first version value.

2. The method of claim 1, wherein the indication that the secondary resource associated with the first version value is to be stored is a file header.

3. The method of claim 2, wherein the file header includes an indication that the secondary resource associated with the first version value does not expire.

4. The method of claim 1, wherein the secondary resource file, the first version value, and the indication that the secondary resource associated with the first version value and the first version value are to be stored are transmitted within a secondary resource carrier.

5. The method of claim 4, wherein the secondary resource carrier further includes instructions for comparison of the first version value with a different version value.

6. The method of claim 4, wherein the secondary resource carrier further includes instructions for requesting the difference information the first version value is different from the second version value.

7. The method of claim 1, wherein requesting the difference information is performed locally at the client device.

8. The method of claim 1, further including generating, in response to receiving the request for the difference information, the difference information based on the differences between the secondary resource associated with the first version value and the secondary resource associated with the second version value.

9. The method of claim 1, further including retrieving, in response to receiving the request for the difference information, the difference information from memory accessible by the server.

10. The method of claim 1, wherein the location of the secondary resource associated with a second version value is the location of the secondary resource associated with the first version value.

11. The method of claim 1, wherein the location of the secondary resource associated with a second version value is different from the location of the secondary resource associated with the first version value.

12. A device for providing secondary resource files to a client device over a network, the device comprising:
   a processor; and
   memory, including a first part for storing secondary resource files; and
   the processor being configured to:
   receive a first request for information from the client device;
   transmit, in response to the first request for information, a first version value, a location of the secondary resource associated with the first version value, and an indication that the first requested information is not to be stored;
   transmit the secondary resource associated with the first version value, the first version value, and an indication that the secondary resource associated with the first version value and the first version value are to be stored;
   receive, by a server, a second request for information from the client device;
   transmit, in response to the second request for information, the second version value, a location of a secondary resource associated with the second version value, an indication that the second requested information is not to be stored, and instructions to request difference information if the first version value is different from the second version value;
   receive a request for difference information;
   identify the difference information; and
   transmit the difference information to the client device.

13. The device of claim 12, wherein the secondary resource file, the first version value, and the indication that the secondary resource associated with the first version value and the first version value are to be stored are received within a secondary resource carrier.

14. The device of claim 13, wherein the secondary resource carrier further includes instructions for comparison of the first version value with a different version value.

15. The device of claim 13, wherein the secondary resource carrier further includes instructions for requesting the difference information the first version value is different from the second version value.

16. The device of claim 12, wherein the memory, includes a second part for storing difference information.

17. The device of claim 12, wherein the difference information is determined by identifying the differences between the secondary resource associated with the first version value and the secondary resource associated with the second version value.

18. The device of claim 12, wherein the location of the secondary resource associated with a second version value is the location of the secondary resource associated with the first version value.

19. The device of claim 12, wherein the indication that the second requested information is not to be stored is a file header.

* * * * *